United States Patent [19]
Cullen et al.

[11] Patent Number: 5,497,745
[45] Date of Patent: Mar. 12, 1996

[54] ENGINE CONTROL FOR ENHANCED CATALYST WARM UP WHILE MAINTAINING MANIFOLD VACUUM

[75] Inventors: Michael J. Cullen, Northville; Alan R. Dona, Huntington Woods, both of Mich.

[73] Assignee: Ford Motor Company, Dearborn, Mich.

[21] Appl. No.: 393,796

[22] Filed: Feb. 24, 1995

[51] Int. Cl.$^6$ .............................. F02D 41/16; F02M 3/06; F02P 5/145

[52] U.S. Cl. ................. 123/339.11; 123/339.23; 123/422

[58] Field of Search .................. 123/339.11, 339.19, 123/339.23, 421, 422, 423; 60/285

[56] References Cited

U.S. PATENT DOCUMENTS

| | | | |
|---|---|---|---|
| 4,144,853 | 3/1979 | Maruoka et al. | 60/285 |
| 4,696,272 | 9/1987 | Kato et al. | 123/339.11 |
| 4,697,563 | 10/1987 | Becker et al. | 123/422 |
| 4,803,967 | 2/1989 | Ohkumo | 123/422 |
| 4,844,026 | 7/1989 | Tomisawa | 123/422 |
| 4,884,540 | 12/1989 | Kishimoto et al. | 123/339.11 |
| 4,974,444 | 12/1990 | Neubacher | 73/118.1 |
| 5,211,011 | 5/1993 | Nishikawa et al. | 60/284 |
| 5,237,818 | 8/1993 | Ishii et al. | 60/285 |
| 5,303,168 | 4/1994 | Cullen et al. | 364/557 |
| 5,390,491 | 2/1995 | Suzumura et al. | 60/285 |
| 5,445,124 | 8/1995 | Tomisawa et al. | 123/339.11 |

*Primary Examiner*—Willis R. Wolfe
*Attorney, Agent, or Firm*—Allan J. Lippa; Roger L. May

[57] ABSTRACT

An engine controller (12) controls an ignition system (88) and bypass throttle valve (96). An ignition timing signal is set to an initial value as a function of engine (10) operating parameters. The timing signal is retarded during cold operation to rapidly warm a catalyst converter (20) coupled to the engine exhaust (48). When the vacuum in the intake manifold (44) falls below a threshold level, the ignition timing signal is advanced beyond the initial value. The ignition timing signal is retarded back towards its initial value when the manifold vacuum exceeds the threshold value. Concurrently, the initial timing signal is controlled to achieve desired engine idle speed.

17 Claims, 4 Drawing Sheets

ENGINE CONTROL FOR ENHANCED CATALYST WARM UP WHILE MAINTAINING MANIFOLD VACUUM

FIELD OF THE INVENTION

The field of the invention relates to engine control, and more particularly, control of an engine's ignition timing.

BACKGROUND OF THE INVENTION

Engine controllers are known which control ignition timing for various reasons. For example, U.S. Pat. No. 4,144,853 discloses a control system in which engine ignition timing is retarded during cold operation to more rapidly warm the catalytic converter. Idle speed control systems are also known which advance or retard ignition timing to rapidly increase or decrease idle speed in response to an idle speed error signal. U.S. Pat. No. 5,303,168 discloses such a system.

The inventors herein have recognized numerous problems with the above approaches. One such problem is that retard of ignition timing and the resulting decrease in engine idle speed may result in a decrease in intake manifold vacuum below a desired vacuum level. Such a problem is more likely to occur during cold engine operation when: ignition timing is retarded for catalyst warmup; ignition timing may be further retarded to control engine idle speed; and engine friction is relatively high.

Another problem recognized by the inventors occurs during idle speed control when air flow inducted into the engine through a bypass throttle valve positioned in parallel to the main throttle. Control of the bypass throttle valve is limited to a preselected range of authority. When the bypass throttle valve is open to its maximum range of authority, it is unable to increase engine speed to compensate for a retard in ignition timing. An undesired decrease in idle speed may then result.

SUMMARY OF THE INVENTION

An object of the invention claimed herein is to control engine ignition timing without incurring an undesired decrease in manifold vacuum or incurring an undesired decrease in engine idle speed.

The problems of prior art approaches are overcome, and the objects and advantages of the claimed invention achieved, by providing a control system and method for controlling an engine having an ignition system responsive to an ignition timing signal and an exhaust coupled to a catalytic converter. In one particular aspect of the invention, the method comprises the steps of: setting the ignition timing signal to an initial value as a function of engine operating parameters; advancing the ignition timing signal beyond the initial value when an indication of engine intake manifold vacuum is below a threshold value; and retarding the ignition timing signal when the manifold vacuum indication is greater than the threshold value.

Preferably, the method may include the steps of modulating of a bypass valve controlling air flow inducted into the engine to maintain engine idle speed within a desired range. And, preferably, the method may include a step of advancing the ignition timing signal beyond the initial value when the bypass valve modulation exceeds a preselected value.

An advantage of the above aspect of the invention is that ignition timing is controlled without incurring an undesired decrease in manifold vacuum. A further advantage of the above aspect of the invention is that engine idle speed may be maintained by controlling a bypass throttle valve and ignition timing without incurring an undesired decrease in engine speed as the bypass valve reaches its control limit.

BRIEF DESCRIPTION OF THE DRAWINGS

The object and advantages of the claimed invention will become more clearly apparent from the following detailed description of an example of operation described with reference to the drawings wherein:

DESCRIPTION OF THE PREFERRED EMBODIMENTS

Figure 1:
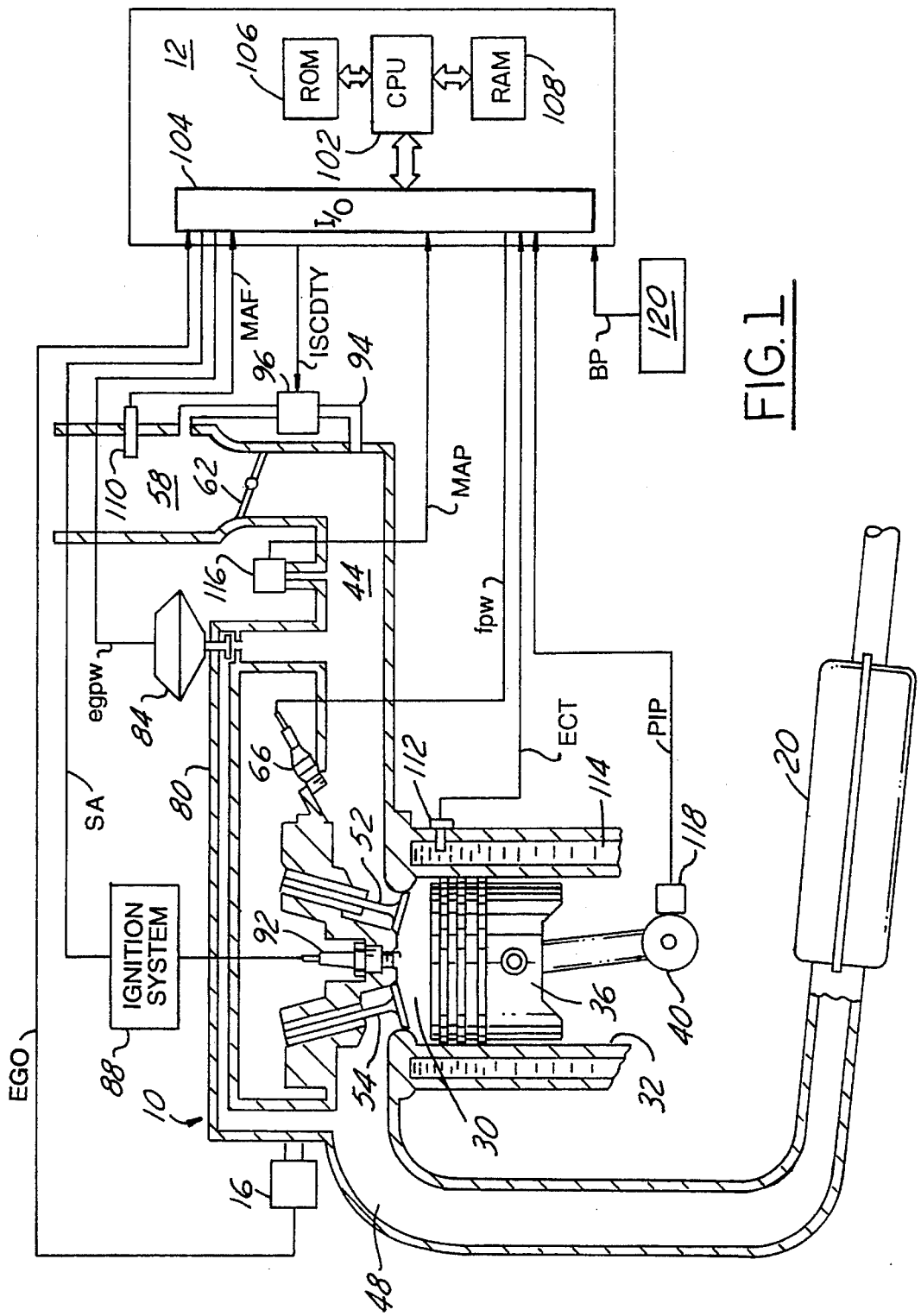
FIG. 1 is block diagram of an embodiment in which the invention is used to advantage.

Internal combustion engine 10 comprising a plurality of cylinders, one cylinder of which is shown in FIG. 1, is controlled by electronic engine controller 12. In general terms which are described later herein with particular reference to FIGS. 2A–2B, 3, and 4, controller 12 controls engine ignition timing and idle speed to provide rapid warm up of catalytic converter 20.

Continuing with FIG. 1, engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Intake manifold 44 is shown communicating with throttle body 58 via throttle plate 62. Intake manifold 44 is also shown having fuel injector 66 coupled thereto for delivering liquid fuel in proportion to the pulse width of signal fpw from controller 10. Fuel is delivered to fuel injector 66 by a conventional fuel system (not shown) including a fuel tank, fuel pump, and fuel rail (not shown).

Exhaust gas recirculation (EGR) passageway 80 is shown communicating between exhaust manifold 48 and intake manifold 44. Exhaust gas recirculation valve 84 is shown coupled to exhaust gas passageway 80 for controlling the flow of recirculated exhaust gases in proportion to signal egpw from controller 12. Typically, controller 12 sets egpw to deliver a schedule of EGR percent versus MAF and rpm.

Conventional distributorless ignition system 88 provides ignition spark to combustion chamber 30 via spark plug 92 in response to spark advance signal SA from controller 12.

Catalytic type exhaust gas oxygen sensor 16 is shown coupled to exhaust manifold 48 upstream of catalytic converter 20. Sensor 16 provides signal EGO to controller 12 which converts signal EGO into a two-state signal. A high voltage state of converted signal EGO indicates exhaust gases are rich of a desired air/fuel ratio and a low voltage state of converted signal EGO indicates exhaust gases are lean of the desired air/fuel ratio. Typically, the desired air/fuel ratio is selected as stoichiometry which falls within the peak efficiency window of catalytic converter 20.

Idle bypass passageway 94 is shown coupled between throttle body 58 and intake manifold 44 via solenoid valve 96. Controller 12 provides pulse width modulated signal ISDC to solenoid valve 96 so that airflow is inducted into engine 10 at a rate proportional to the duty cycle of signal ISDC.

Controller 12 is shown in FIG. 1 as a conventional microcomputer including: microprocessor unit 102, input/output ports 104, read only memory 106, random access memory 108, and a conventional data bus. Controller 12 is shown receiving various signals from sensors coupled to engine 10, in addition to those signals previously discussed, including: measurements of inducted mass air flow (MAF) from mass air flow sensor 110 coupled to throttle body 58; engine coolant temperature (ECT) from temperature sensor 112 coupled to cooling sleeve 114; a measurement of manifold pressure (MAP) from manifold pressure sensor 116 coupled to intake manifold 44; a profile ignition pickup signal (PIP) from Hall effect sensor 118 coupled to crankshaft 40; and a measurement of barometric pressure (BP) from barometric pressure sensor 120.

Figure 2A:
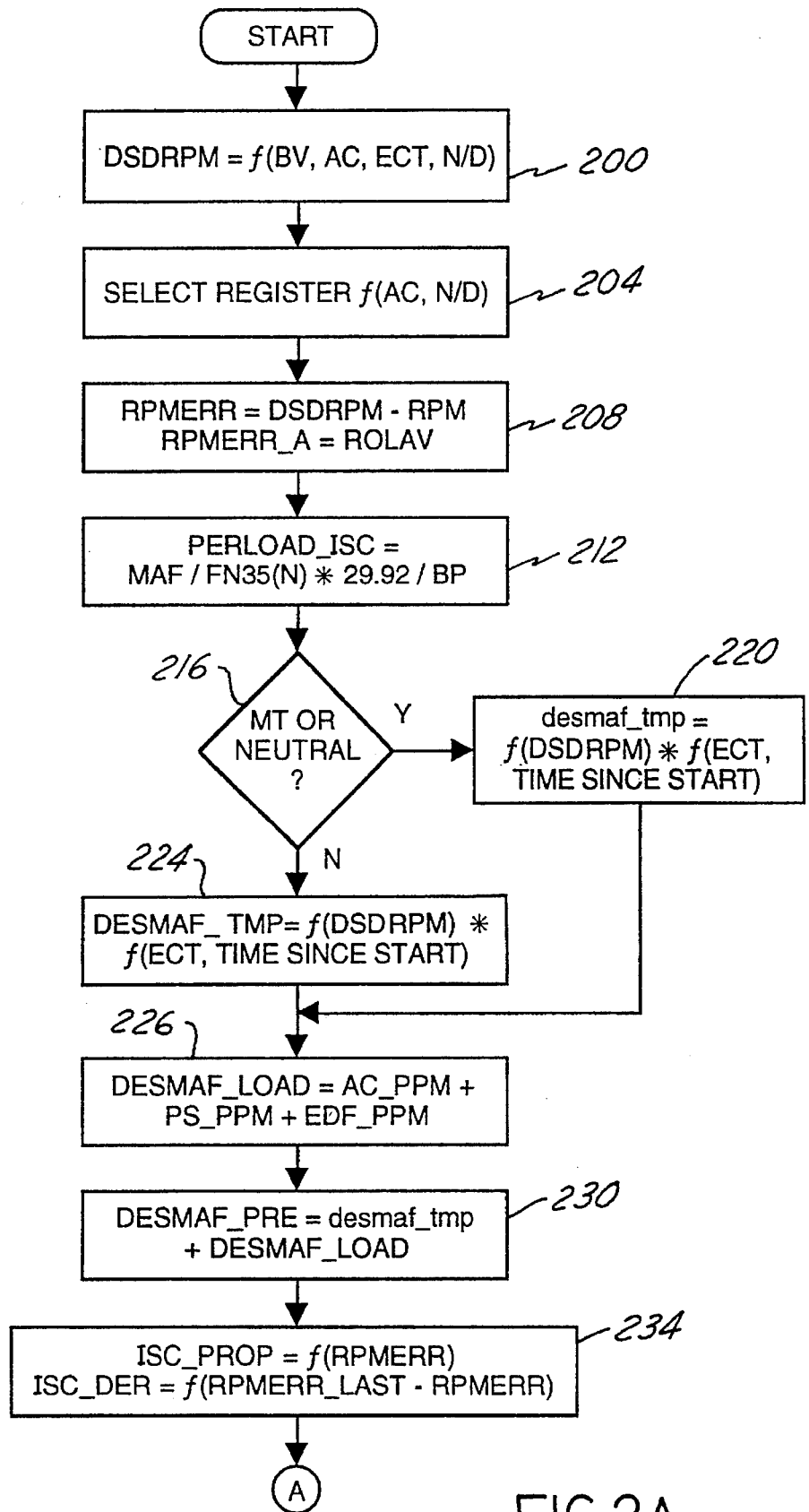
FIGS. 2A–2B, 3, and 4 are flow charts of various operations performed by portions of the embodiment shown in FIG. 1.
Figure 2B:
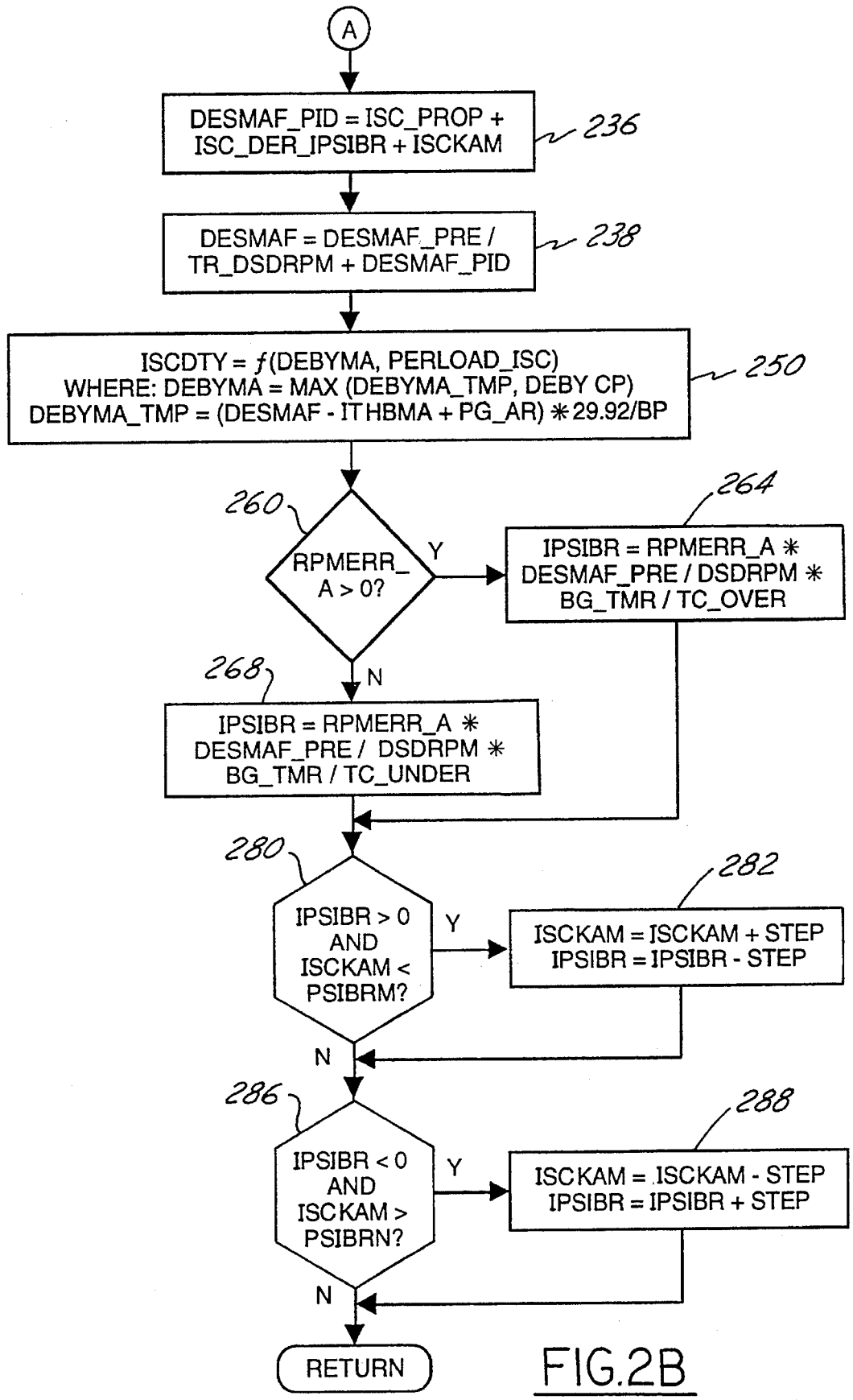
Figure 3:
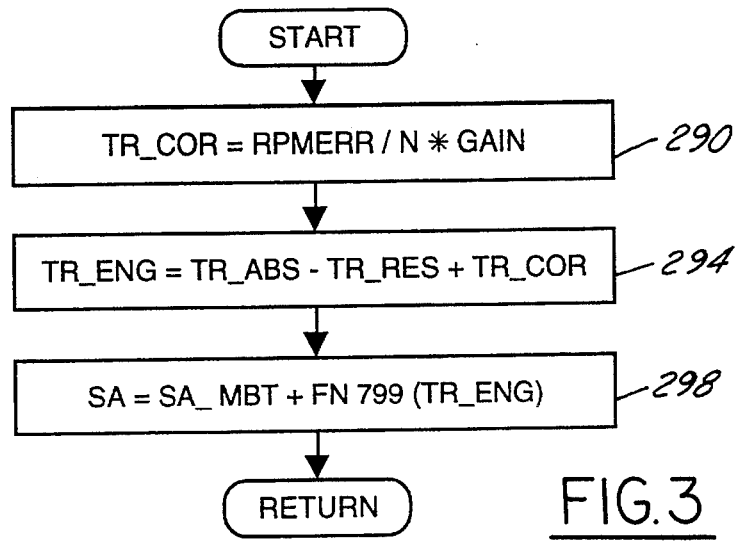

Referring now to FIGS. 2A–2B and 3, the subroutines executed by controller 12 for controlling engine idle speed are now described. Referring first to FIGS. 2A–2B, desired idle speed signal DSDRPM is first calculated as a function of battery voltage BV, air conditioner enable signal AC, engine coolant temperature ECT and the neutral or drive transmission signal N/D (step 200). One of four storage registers is selected in step 204 as a function of signal AC, and signal N/D. More specifically, the following registers are selected: a first register is selected if the transmission is not in drive and the air conditioner is on; a second register is selected if the air conditioner is off and the transmission is in drive; a third register is selected if the transmission is in neutral and the air conditioner is on; and a fourth register is selected if the transmission is in neutral and the air conditioner is off.

Idle speed error signal RPMERR is calculated in step 208 by subtracting indication of engine speed signal rpm from desired idle speed signal DSDRPM. Signal RPMERR_A is also generated which is a rolling average of signal RPMERR with exponential smoothing. During step 212, an estimate of the pressure ratio across air bypass valve 96 is provided. More specifically, signal PERLOAD_ISC is calculated by dividing a value (FN35) related to the peak air charge at wide open throttle into signal MAF. The resulting quotient is then multiplied by the ratio of 29.92 to barometric pressure BP.

If the vehicle has a manual transmission (MT) or an automatic transmission which is in neutral (step 216), desired air flow signal DESMAF_tmp is generated in step 220 as follows. A function of desired idle speed (DSDRPM) is multiplied times a function of engine coolant temperature (ECT). The resultant product is multiplied by time since engine start. On the other hand, if the answer to step 216 is negative, signal DESMAF_TMP is generated in step 224 as follows. A function of desired idle speed DSDRPM is multiplied by another function of engine coolant temperature (ECT) and the PM time since start.

Correction factor DESMAF_LOAD for desired mass air flow at various loads is generated during step 226. More specifically, signal DESMAF_LOAD is generated by summing signal AC_PPM when the air conditioner is on, signal PS_PPM when power steering is employed, and signal EDF_PPM when a cooling fan is activated (step 226). Open loop prediction of desired air flow (signal DESMAF_PRE) is generated during step 230 by adding previously calculated signal desmaf_tmp and signal DESMAF_LOAD.

Desired mass air flow DESMAF is generated from a proportional plus integral controller as now described with reference to steps 234–238. Proportional and derivative control gains are first generated. Proportional gain ISC_PROP is generated as a function of rpm and error signal RPMERR. Derivative term ISC_DER is generated as a function of the difference between rpm error signal RPMERR for the present and preceding background loops (step 234). Desired air flow signal DESMAF_PID from the proportional plus integral controller (236) is generated by summing proportional term ISC_PROP with the product of derivative term ISC_DER times integral error term IPSIBR, and adding adapted integral term ISCKAM (step 236). Total desired air bypass flow DESMAF is then generated by adding proportional plus derivative output signal DESMAF_PID to the ratio of signal DESMAF_PRE to signal TR_DSDRPM (step 238).

Air bypass duty cycle signal ISCDTY is calculated in step 250 as a function of the air bypass valve versus duty cycle and pressure ratio. More specifically, signal ISCDTY is generated as a function of signals DEBYMA and signal PERLOAD_ISC. Signal PERLOAD_ISC was generated as previously described with reference to step 212. Signal DEBYMA is generated as the maximum of calibratable maximum DEBYCP and signal DEBYMA_TMP. As shown in step 250, signal DEBYMA_TMP is generated the ratio of 29.92 over barometric pressure BP times the difference between signal DESMAF and the sum of signal ITHBMA and signal PG_AR. It represents additional air induction by air leakage past the throttle plate (ITHBMA) and by purge air (PG_AR).

If the rolling average of the engine speed error signal (RPMERR_A) is positive (step 260), then integral error term IPSIBR is generated as shown in the following equation:

IPSIBR=RPMERR_A * DESMAF_PRE/DSDRPM * BG_TMR/TC_OVER where:
BG_TMR is the background loop time; and
TC_OVER is a calibratable time constant for overspeed.
On the other hand, when signal RPMERR_A is negative, the integral error term is calculated by the following equation:

IPSIBR=RPMERR_A * DESMAF_PRE/DSDRPM * BG_TMR/TC_UNDER where:
TC_UNDER is a calibratable time constant for underspeed.
When integration term IPSIBR is positive and adaptive air flow corrections ISCKAM are less than minimum clip value PSIBRN (step 280), air flow corrections ISCKAM and integral term IPSIBR are generated by the equations shown in Step 282 as follows:

ISCKAM=ISCKAM (previous)+STEP

IPSIBR=IPSIBR (previous)−STEP where:
STEP is a calibratable step size.
When integral term IPSIBR is negative and air flow correction term ISCKAM is greater than minimum clip PSIBRN (step 286), air flow correction terms ISCKAM and integral term IPSIBR are generated by the equations shown in Step 288 as follows:

ISCKAM=ISCKAM (previous)−STEP

IPSIBR=IPSIBR (previous)+STEP

Referring now to FIG. 3, a subroutine for correcting idle speed in response to speed error signal RPMERR by advancing or retarding ignition timing is now described. Control of engine idle speed by ignition timing provides a faster correction than is provided by control of air bypass valve 96 and, therefore, supplements such air bypass control. In this particular example, torque, correction signal TR_COR is calculated by dividing engine speed (N) into speed error signal RPMERR and multiplying the resulting quotient times a gain value as shown in step 290. The final desired torque ratio (TR_ENG) is then calculated by adding torque correction signal TR_COR to the difference between signal TR_ABS and signal TR_RES (step 294). Signal TR_ABS represents the torque ratio at absolute spark advance. And signal TR_RES is a reserved torque ratio provided for an increased range of authority of the idle speed control feedback loop.

Ignition timing signal SA is generated in step 298 by correcting ignition timing at MBT with signal FN799 (TR_ENG). In this example, signal FN799 (TR_ENG) is the ignition timing retard from MBT utilized to achieve desired torque ratio TR_ENG.

Figure 4:
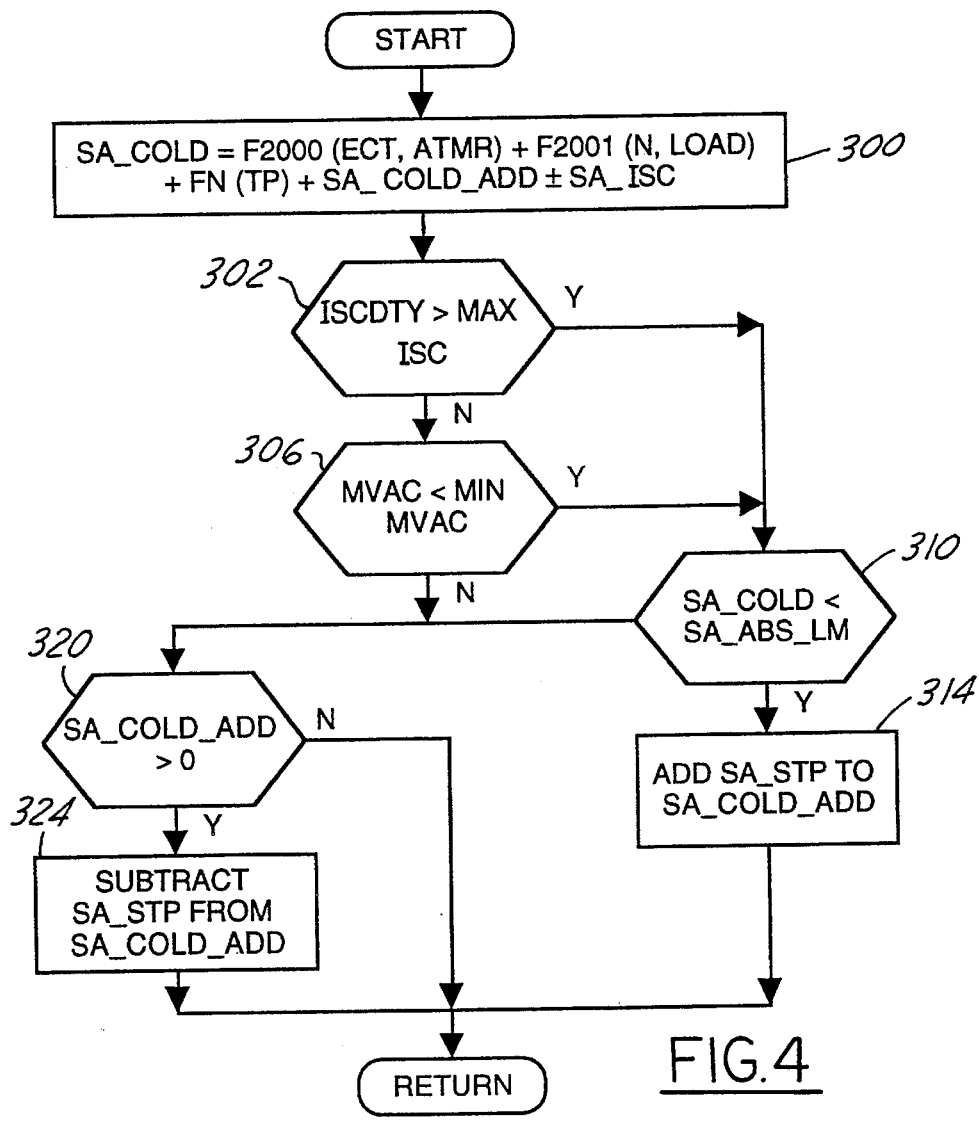

A subroutine executed by controller 12 for controlling ignition timing is now described with particular reference to FIG. 4. In the particular example shown herein, ignition timing is controlled during cold engine operation such that spark advance or ignition timing signal SA is provided as signal SA_COLD. Those skilled in the art, however, will recognize that the invention claimed herein is applicable to other forms of ignition timing control. For example, the claimed invention is applicable whenever the ignition timing is retarded such as during idle speed control, or knock control.

As described in greater detail below, the ignition timing signal SA_COLD is generated at a retarded value from nominal or base ignition timing to more rapidly heat catalytic converter 20. In addition to retarding ignition timing, engine air/fuel ratio is also enleaned to provide more oxygen in the engine exhaust thereby further enhancing catalyst warmup during cold engine operation.

Continuing with FIG. 4, ignition timing signal SA_COLD is generated in step 300 by the following equation:

$$SA\_COLD = F2000(ECT, ATME) + F2001(N, LOAD) + FN(TP) + SA\_COLD\_ADD \pm SA\_ISC$$

where:

F2000(ECT,ATME) is a function of engine coolant temperature (ECT) and time since engine start (ATME);

F2001(N,LOAD) is a function of engine speed and load;

FN(TP) is a function of throttle tip-in;

SA_COLD_ADD is an adjustment value generated as described below 4; and

SA_ISC is an ignition timing advance or retarded provided by the idle speed control subroutine described previously with reference to FIG. 3.

When idle speed control duty cycle signal ISCDTY is greater than maximum value MAXISC (step 302), step 310 is entered. Value MAXISC is the maximum range of authority for controlling idle speed by controlling air flow through bypass valve 96.

During step 310 and 314, signal SA_COLD_ADD is advanced by step SA_STP (step 314) if ignition timing signal SA_COLD has not reached its maximum absolute limit SA_ABS_LM (step 310). Stated another way, if idle speed control duty cycle ISCDTY has reached the maximum limit so that engine speed can no longer be increased by increasing the duty cycle controlling bypass valve 96 (step 302), and ignition timing SA_COLD has not reached its absolute limit (step 310), then engine idle speed is increased by advancing ignition timing as shown in step 314.

Ignition timing signal SA_COLD is also advanced (steps 310 and 314) when the vacuum of intake manifold 44 (MVAC) is less than minimum desired value MINMVAC (step 306). Stated another way, engine ignition timing is advanced to prevent manifold vacuum MVAC from falling below a minimum desired vacuum provided ignition timing has not reached its absolute limit (step 310).

When idle speed duty cycle ISCDTY has not reached maximum value MAXISC (step 302), and manifold vacuum MVAC is above minimum value MINMVAC (step 306), ignition timing signal SA_COLD_ADD is retarded by step SA_STP (step 324). This continues each background loop until the amount of ignition advance previously added (SA_COLD_ADD) is forced to zero (step 320). Stated another way, when idle speed duty cycle ISCDTY and manifold vacuum MVAC have not reached their limits, ignition timing is retarded to reduce any ignition timing advance previously added to keep duty cycle ISCDTY and manifold vacuum MVAC within their limits.

The reading of the foregoing example of an embodiment which utilizes the invention by those skilled in the art will bring to mind various possible alterations and modifications without departing from the spirit and scope of the invention claimed herein. It is, therefore, intended that the following claims include all such alterations and modifications within the scope of the invention.

We claim:

1. A method for controlling an internal combustion engine having an ignition system responsive to an ignition timing signal and an exhaust coupled to a catalytic converter, comprising the steps of:

setting the ignition timing signal to an initial value as a function of engine operating parameters;

advancing the ignition timing signal beyond said initial value when an indication of engine intake manifold vacuum is below a threshold value; and retarding the ignition timing signal when said manifold vacuum indication is greater than said threshold value.

2. The method recited in claim 1 further comprising a step of retarding said initial value when said manifold vacuum indication is less than said threshold value and the ignition timing was advanced from said initial value to a value greater than a predetermined value.

3. The method recited in claim 1 wherein said step of retarding is limited to retarding the ignition timing back to said initial value.

4. The method recited in claim 1 wherein said initial value is provided as a function of engine temperature.

5. The method recited in claim 4 wherein said initial value is provided as a function of engine speed and load.

6. The method recited in claim 5 wherein said initial value is provided as a function of engine throttle position.

7. The method recited in claim 1 further comprising the steps of advancing and retarding the ignition timing signal to maintain engine idle speed within a desired range.

8. The method recited in claim 7 further comprising the steps of increasing and decreasing modulation of a bypass valve controlling airflow inducted into the engine to maintain said engine idle speed within said desired range.

9. The method recited in claim 8 further comprising a step of advancing the ignition timing signal beyond said initial value when said bypass valve modulation exceeds a preselected value.

10. The method recited in claim 1 wherein said step of setting the ignition timing signal to an initial value is selected to achieve rapid warm up of the converter.

11. A method for controlling an internal combustion engine having an ignition system responsive to an ignition timing signal and an exhaust coupled to a catalytic converter, comprising the steps of:

setting the ignition timing signal to an initial value as a function of engine operating parameters during cold engine operation to warm the catalyst, said initial value being retarded from nominal ignition timing occurring during warm engine operation;

advancing the ignition timing signal in incremental steps each sample period when an indication of engine intake manifold vacuum is less than a threshold value; and retarding the ignition timing signal in incremental steps each of said sample periods when said manifold vacuum indication is greater than said threshold value until the ignition timing signal returns to said initial value.

12. The method recited in claim 11 further comprising a step of retarding said initial value when said manifold vacuum indication is less than said threshold value and the ignition timing was advanced from said initial value to a value greater than a predetermined value.

13. The method recited in claim 12 further comprising a step of advancing the ignition timing signal beyond said initial value when an indication of airflow inducted into the engine during engine idle exceeds a preselected value.

14. The method recited in claim 11 further comprising a step of advancing said initial value by a preselected amount in response to an indication of increased throttle demand.

15. A control system controlling an internal combustion engine having an exhaust coupled to a catalytic converter, comprising:

an ignition system for providing ignition spark to each cylinder of the engine in response to an ignition timing signal;

a bypass valve for providing air for induction into the engine in proportion to a modulation signal during engine idle;

a controller maintaining said idle speed within a desired range by advancing and retarding the ignition timing and adjusting duty cycle of said modulation signal; and said controller setting the ignition timing signal to an initial value as a function of engine operating parameters during cold engine operation to rapidly warm the catalyst, said controller advancing the ignition timing signal beyond said initial value when an indication of engine intake manifold vacuum is below a threshold value and retarding the ignition timing signal when said manifold vacuum indication is greater than said threshold value.

16. The control system recited in claim 15 further comprising a step of advancing the ignition timing signal beyond said initial value when said modulation signal duty cycle exceeds a preselected value.

17. The method recited in claim 16 further comprising a step of advancing said initial value by a preselected amount in response to an indication of increased throttle demand.

* * * * *